United States Patent
Simons (12)

(10) Patent No.: US 8,417,601 B1
(45) Date of Patent: Apr. 9, 2013

(54) VARIABLE RATE PAYMENT CARD

(75) Inventor: Paul Simons, Princeton, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 842 days.

(21) Appl. No.: 11/874,561

(22) Filed: Oct. 18, 2007

(51) Int. Cl.
*G06Q 40/00* (2006.01)

(52) U.S. Cl. .......................... 705/35; 705/36

(58) Field of Classification Search ............. 705/14, 705/35–40
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Hale et al. |
| 4,689,478 A | 8/1987 | Hale et al. |
| 4,700,055 A | 10/1987 | Kashkashian, Jr. |
| 4,746,787 A | 5/1988 | Suto et al. |
| 4,750,119 A | 6/1988 | Cohen et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |

(Continued)

FOREIGN PATENT DOCUMENTS

| | | |
|---|---|---|
| CA | 2293321 | 12/1998 |
| EP | 0843292 A2 | 5/1998 |

(Continued)

OTHER PUBLICATIONS

Cardex Incentives, www.cardex.com, Apr. 6, 1999.

(Continued)

*Primary Examiner* — Thu Thao Havan
(74) *Attorney, Agent, or Firm* — Lowenstein Sandler LLP

(57) ABSTRACT

A method of arranging for payment of a purchase includes receiving, from a supplier, agreement to accept a payment from a buyer via use of a payment card having variable payment terms; after a purchase by the buyer from the supplier, assessing the supplier a standard interchange rate; receiving, from the buyer, approval to pay the invoice; and issuing, to the supplier, a rebate, based upon when the approval to pay the invoice was received. the variable payment terms are calculated by: determining a first early payment date; determining a second standard payment date; assessing against the supplier a first percentage of the standard interchange rate if the invoice is approved by the first early payment date; and assessing against the supplier a second percentage of the standard interchange rate if the invoice is approved on or after the second standard payment date.

17 Claims, 1 Drawing Sheet

U.S. PATENT DOCUMENTS

| | | |
|---|---|---|
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,361,062 A | 11/1994 | Weiss et al. |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,733 A | 8/1998 | Jachimowicz et al. |
| 5,794,207 A | 8/1998 | Walker |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,826,243 A | 10/1998 | Musmanno et al. |

| | | | | | | |
|---|---|---|---|---|---|---|
| 5,832,457 | A | 11/1998 | O'Brien | 6,032,136 A | 2/2000 | Brake, Jr. et al. |
| 5,832,488 | A | 11/1998 | Eberhardt | 6,036,099 A | 3/2000 | Leighton |
| 5,835,061 | A | 11/1998 | Stewart | 6,038,292 A | 3/2000 | Thomas |
| 5,835,576 | A | 11/1998 | Katz | 6,038,552 A | 3/2000 | Fleischl et al. |
| 5,839,113 | A | 11/1998 | Federau et al. | 6,041,315 A | 3/2000 | Pollin |
| 5,845,259 | A | 12/1998 | West et al. | 6,045,042 A | 4/2000 | Ohno |
| 5,845,260 | A | 12/1998 | Nakano et al. | 6,047,067 A | 4/2000 | Rosen |
| 5,852,811 | A | 12/1998 | Atkins | 6,047,268 A | 4/2000 | Bartoli et al. |
| 5,852,812 | A | 12/1998 | Reeder | 6,049,463 A | 4/2000 | O'Malley et al. |
| 5,857,079 | A | 1/1999 | Claus et al. | 6,049,773 A | 4/2000 | McCormack et al. |
| 5,857,175 | A | 1/1999 | Day | 6,049,782 A | 4/2000 | Gottesman et al. |
| 5,857,709 | A | 1/1999 | Chock | 6,058,378 A | 5/2000 | Clark et al. |
| 5,859,419 | A | 1/1999 | Wynn | 6,064,985 A | 5/2000 | Anderson |
| 5,864,609 | A | 1/1999 | Cross et al. | 6,065,675 A | 5/2000 | Teicher |
| 5,864,828 | A | 1/1999 | Atkins | 6,068,183 A | 5/2000 | Freeman et al. |
| 5,864,830 | A | 1/1999 | Armetta et al. | 6,070,067 A | 5/2000 | Nguyen et al. |
| RE36,116 | E | 2/1999 | McCarthy | 6,070,147 A | 5/2000 | Harms et al. |
| 5,870,718 | A | 2/1999 | Spector | 6,070,153 A | 5/2000 | Simpson |
| 5,870,721 | A | 2/1999 | Norris | 6,076,068 A | 6/2000 | DeLapa et al. |
| 5,875,437 | A | 2/1999 | Atkins | 6,076,072 A | 6/2000 | Libman |
| 5,883,377 | A | 3/1999 | Chapin, Jr. | 6,078,888 A | 6/2000 | Johnson, Jr. |
| 5,884,278 | A | 3/1999 | Powell | 6,078,891 A | 6/2000 | Riordan et al. |
| 5,884,285 | A | 3/1999 | Atkins | 6,091,817 A | 7/2000 | Bertina et al. |
| 5,887,065 | A | 3/1999 | Audebert | 6,092,056 A | 7/2000 | Tull, Jr. et al. |
| 5,890,138 | A | 3/1999 | Godin et al. | 6,095,412 A | 8/2000 | Bertina et al. |
| 5,890,140 | A | 3/1999 | Clark et al. | 6,095,416 A | 8/2000 | Grant et al. |
| H1794 | H | 4/1999 | Claus | 6,098,053 A | 8/2000 | Slater |
| 5,897,620 | A | 4/1999 | Walker et al. | 6,105,011 A | 8/2000 | Morrison, Jr. |
| 5,905,246 | A | 5/1999 | Fajkowski | 6,105,865 A | 8/2000 | Hardesty |
| 5,907,350 | A | 5/1999 | Nemirofsky | 6,109,525 A | 8/2000 | Blomqvist et al. |
| 5,911,135 | A | 6/1999 | Atkins | 6,112,191 A | 8/2000 | Burke |
| 5,911,136 | A | 6/1999 | Atkins | 6,115,458 A | 9/2000 | Taskett |
| 5,914,472 | A | 6/1999 | Foladare et al. | 6,119,097 A | 9/2000 | Ibarra |
| 5,920,629 | A | 7/1999 | Rosen | 6,119,932 A | 9/2000 | Maloney et al. |
| 5,920,844 | A | 7/1999 | Hotta et al. | 6,122,623 A | 9/2000 | Garman |
| 5,920,847 | A | 7/1999 | Kolling et al. | 6,128,598 A | 10/2000 | Walker et al. |
| 5,923,734 | A | 7/1999 | Taskett | 6,128,599 A | 10/2000 | Walker et al. |
| 5,926,800 | A | 7/1999 | Baronowski et al. | 6,129,274 A | 10/2000 | Suzuki |
| 5,930,217 | A | 7/1999 | Kayanuma | 6,134,536 A | 10/2000 | Shepherd |
| 5,931,764 | A | 8/1999 | Freeman et al. | 6,138,917 A | 10/2000 | Chapin, Jr. |
| 5,933,817 | A | 8/1999 | Hucal | 6,145,741 A | 11/2000 | Wisdom et al. |
| 5,937,068 | A | 8/1999 | Audebert | 6,148,297 A | 11/2000 | Swor et al. |
| 5,940,811 | A | 8/1999 | Norris | 6,161,096 A | 12/2000 | Bell |
| 5,952,641 | A | 9/1999 | Korshun | 6,163,770 A | 12/2000 | Gamble et al. |
| 5,953,423 | A | 9/1999 | Rosen | 6,164,533 A | 12/2000 | Barton |
| 5,953,710 | A | 9/1999 | Fleming | 6,167,385 A | 12/2000 | Hartley-Urquhart |
| 5,955,961 | A | 9/1999 | Wallerstein | 6,169,975 B1 | 1/2001 | White et al. |
| 5,956,695 | A | 9/1999 | Carrithers et al. | 6,173,267 B1 | 1/2001 | Cairns |
| 5,963,648 | A | 10/1999 | Rosen | 6,182,048 B1 | 1/2001 | Osborn et al. |
| 5,970,479 | A | 10/1999 | Shepherd | 6,182,894 B1 | 2/2001 | Hackett et al. |
| 5,970,480 | A | 10/1999 | Kalina | 6,186,793 B1 | 2/2001 | Brubaker |
| 5,974,399 | A | 10/1999 | Giuliani et al. | 6,189,787 B1 | 2/2001 | Dorf |
| RE36,365 | E | 11/1999 | Levine et al. | 6,192,113 B1 | 2/2001 | Lorsch |
| 5,984,180 | A | 11/1999 | Albrecht | 6,195,644 B1 | 2/2001 | Bowie |
| 5,984,191 | A | 11/1999 | Chapin, Jr. | 6,202,053 B1 | 3/2001 | Christiansen et al. |
| 5,987,434 | A | 11/1999 | Libman | RE37,122 E | 4/2001 | Levine et al. |
| 5,988,509 | A | 11/1999 | Taskett | 6,223,143 B1 | 4/2001 | Weinstock et al. |
| 5,991,413 | A | 11/1999 | Arditti et al. | 6,227,447 B1 | 5/2001 | Campisano |
| 5,991,743 | A | 11/1999 | Irving et al. | 6,243,688 B1 | 6/2001 | Kalina |
| 5,991,748 | A | 11/1999 | Taskett | 6,263,316 B1 | 7/2001 | Khan et al. |
| 5,991,750 | A | 11/1999 | Watson | 6,265,977 B1 | 7/2001 | Vega et al. |
| 5,999,596 | A | 12/1999 | Walker et al. | 6,278,981 B1 | 8/2001 | Dembo et al. |
| 6,000,608 | A | 12/1999 | Dorf | 6,295,522 B1 | 9/2001 | Boesch |
| 6,000,832 | A | 12/1999 | Franklin et al. | 6,298,336 B1 | 10/2001 | Davis et al. |
| 6,002,383 | A | 12/1999 | Shimada | 6,308,268 B1 | 10/2001 | Audebert |
| 6,003,762 | A | 12/1999 | Hayashida | 6,336,099 B1 | 1/2002 | Barnett et al. |
| 6,004,681 | A | 12/1999 | Epstein et al. | 6,338,048 B1 | 1/2002 | Mori |
| 6,006,988 | A | 12/1999 | Behrmann et al. | 6,341,724 B2 | 1/2002 | Campisano |
| 6,009,415 | A | 12/1999 | Shurling et al. | 6,343,743 B1 | 2/2002 | Lamla |
| 6,014,636 | A | 1/2000 | Reeder | 6,345,261 B1 | 2/2002 | Feidelson |
| 6,014,638 | A | 1/2000 | Burge et al. | 6,345,766 B1 | 2/2002 | Taskett et al. |
| 6,014,645 | A | 1/2000 | Cunningham | 6,349,291 B1 | 2/2002 | Varma |
| 6,014,749 | A | 1/2000 | Gloor et al. | 6,360,954 B1 | 3/2002 | Barnardo |
| 6,016,482 | A | 1/2000 | Molinari et al. | 6,366,220 B1 | 4/2002 | Elliott |
| 6,016,954 | A | 1/2000 | Abe et al. | 6,373,969 B1 | 4/2002 | Adler |
| 6,019,284 | A | 2/2000 | Freeman et al. | 6,377,669 B1 | 4/2002 | Walker et al. |
| 6,026,370 | A | 2/2000 | Jermyn | 6,385,591 B1 | 5/2002 | Mankoff |
| 6,029,139 | A | 2/2000 | Cunningham et al. | 6,386,444 B1 | 5/2002 | Sullivan |
| 6,029,890 | A | 2/2000 | Austin | 6,397,202 B1 | 5/2002 | Higgins et al. |

| | | |
|---|---|---|
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,557,750 B1 | 5/2003 | Druse et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,757,710 B2 | 6/2004 | Reed |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 | 4/2005 | Burke |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,089,503 B1 | 8/2006 | Bloomquist et al. |
| 7,104,443 B1 | 9/2006 | Paul et al. |
| 7,165,049 B2 | 1/2007 | Slater |
| 7,775,426 B2 * | 8/2010 | Paul et al. .................. 235/379 |
| 2001/0011227 A1 | 8/2001 | Ashery et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0062249 A1 * | 5/2002 | Iannacci .................. 705/14 |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2002/0194081 A1 | 12/2002 | Perkowski |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0171898 A1 | 8/2005 | Bishop et al. |
| 2006/0047589 A1 | 3/2006 | Grau |

FOREIGN PATENT DOCUMENTS

| | | |
|---|---|---|
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | 94/29112 | 12/1994 |
| WO | 97/41673 | 11/1997 |
| WO | 98/59307 | 12/1998 |
| WO | 99/05633 | 2/1999 |
| WO | 01/18699 | 3/2001 |
| WO | 01/69347 | 9/2001 |
| WO | 01/69347 A2 | 9/2001 |
| WO | 01/69347 A3 | 9/2001 |
| WO | 2005/043277 A3 | 5/2005 |

OTHER PUBLICATIONS

Associates First Capital Corporation, Hoover's Inc., The Industry Standard: The Newsmagazine of the Internet Economy, Thestandard. Net/Companies/Company-Display, Apr. 6, 1999.

Lacker; Stored Value Cards: Costly Private Substitutions for Government Currency, Economic Quarterly, 1996, Economic Quarterly, V82, N3, P1(25), ISSN: 1069-7225, 17 Pages.

The Evolution of a New Consumerism, Chain Store Age, vol. 73, Jun. 1997, pp. 8-9.

Fickenscher; Amex Prepaid Offering is Latest Card for Firms Regarding Employees, American Banker, vol. 161, No. 151, Aug. 8, 1996, pp. 1-2.

Swiftgift; Welcome to Swiftgift, www.swiftgiftcard.com, Dec. 8, 1998, 10 Pages.

Lazarony; Stuck for a Gift? Give a Prepaid Credit Card, www.bankrate.com, Dec. 21, 1998, 1 Page.

Coulton; Incentives Field Moving to Card-Based Series 14, American Banker, Mar. 26, 1998, 3 Pages.

A Store Card Issuer Looks for Lift From Electronic Gift Certificates, Credit Card News, Feb. 1, 1995, 2 Pages.

O'Conner; Maritz Gets Mastercard's Stamp of Approval, Business Travel News, Aug. 19, 1996, 2 Pages.
Boatmen's Floats Stored Value Into the Employee Incentive Waters, Debit Card News, Vol. 2, Issue 2, Jul. 16, 1996, 3 Pages.
Meece; Boatman's Prepaid Cards for Worker-Incentive Firm, American Banker, Jul. 2, 1996, p. 12.
D.C. Area Safeway Stores Look for Increase in Sales Volume and Revenue With Cards, Card News, vol. 6, No. 25, Dec. 30, 1991, pp. 7-9.
Spurgin; Sopininmon! or What's Happening in the Retail Credit Card Environment, Credit World Journal, Vol. 85, No. 4, Mar. 1, 1997, pp. 20-23.
New 1-800-Call-ATT Campaign Promotes One Number for All Calls, AT&T Marketing, News Release, www.att.com/Press/0297/970217.csa.htm, Feb. 17, 1997, 2 Pages.
More Retailers Turn to Co-Branding, Chain Store Age Executive With Shopping Center Age, Feb. 1, 1995, 3 Pages.
Introducing Spendingmoney(TM), Armetta: Marketing & Design Product Concept Report, Oct. 9, 1996, 15 Pages.
Bank; Cash, Check,Charge—What's Next?, Seattle Times, Mar. 6, 1995.
First USA Platinum Connect, First USA Bank, First USA Promotional Mailing, Oct. 1997, 6 Pages.
Introducing the First USA Platinum Connect Card, First USA Promotional Mailing, Dec. 1997, 2 Pages.
Here's the Calling Convenience You Asked for: 1-800-Call-ATT . . . For All Calls, AT&T, Appendix A: for Card Carriers, 1999, 7 Pages.
Piskora; Debit Cards Seen Poised for New Markets, American Banker, Credit/Debit/ATMS, Mar. 7, 1995, p. 16.
Rosen; Cash Just Isn't Flexible Enough: Shops of the Future Will Only Take Cards, Daily Express, Technology Section, Feb. 10, 1995, 1 Page.
Vandenengel; Cards on the Internet: Advertising on a $3 Bill, Industry Intelligence, Feb. 1, 1995, pp. 46-48.
Kutler; Cash Card Creator Looking Beyond Mondex, Feb. 9, 1995.
Britt; Competing in Auto Lending, America's Community Banker, vol. 5, No. 11, Nov. 1, 1996, pp. 33-37.
Clark; Microsoft, VISA to Jointly Develop PC Electronic-Shopping Software, The Wall Street Journal, Nov. 9, 1994, WSJ B9.
Dugas; Payroll May Ask: Paper or Plastic?, USA Today, 3B, Aug. 14, 2001, 1 Page.
Souccar; Smart Cards: 1ST Union Smart Card Pilot Enlists a Second Army Base, American Banker, Digital Frontiers, vol. 164, No. 61, Mar. 31, 1999, 3 Pages.
First Union Issues Smart Cards to Fort Benning Recruits, Cardfax, vol. 1999, No. 60, Mar. 26, 1999, 1 Page.
Brown et al.; Purchasing Card Magic: Eli Lilly Finds Accounts Payable Flying High With Plastic, Corporate Cashflow, vol. 15, No. 12, Nov. 1994, 2 Pages.
Konrad; IBM Had a Bunch of Unusual Ideas in 2003, www.philly.com, Printed Jan. 21, 2004, Posted on Jan. 13, 2004, 2 Pages.
Miller; Section E.2.1: Kerberos Authentication and Authorization System, Project Athena, Cambridge, MA, Dec. 21, 1987, 39 Pages.
Song; A Card That Asks for ID, Time Magazine, Apr. 12, 2004, 1 Page.
CES/Nabanco Introduces Stored Value Card Technology Blockbuster Video is First Merchant Partner, Business Wire, Inc., Jan. 15, 1996.
First Data Markets Stored-Value Cards, Cards International, Jan. 30, 1996, p. 5.
Norris; First Data Unit Develops Blockbuster Cash Card, Omaha World Hearld Sunrise Edition, Business Section, Jan. 19, 1996, p. 16.
Blockbuster Running Test of a Stored Value Card, The American Banker, Sep. 1, 1995.
Welcome to Card Express, The Cardex Incentive Card, as Disclosed in the Cardex Web Site Archived by web.archive.org on Feb. 7, 1998, http://web.archive.org/web/*/http://www.cardex.com, Retrieve Oct. 18, 2003, 8 Pages.
Welcome to Card Express Cardex, Cardex Website Archived by Web.Archive on Oct. 31, 1996, http://web.archive.org/web/*/http://www.cardex.com, Retrieve Oct. 18, 2003, 7 Pages.
Brehl; Banks Issue Cash-Card Pledge, The Toronto Star, Oct. 9, 1997, 1 Page.

Sanchez-Klein; Electronic Purse Alliance Planned, Computerworld Online News, Jul. 29, 1998, Printed Feb. 23, 2001, 2 Pages.
Frequently Asked Questions, Ecard, www.eregard.com, Printed Sep. 23, 2001, 7 Pages.
Business Times; Electronic Purse Can Free You From ATM Drag, Business Times, www.btimes.co.za, Printed Feb. 23, 2001, 1 Page.
Machlis; Have it the Smart Way: Burger King Program Drives Smart-Card Use, Computerworld, Printed Feb. 23, 2001, 1 Page.
Electronic Purse Card to Be Launched Tomorrow, New Straits Times, News Clippings, Sep. 18, 1999, Printed Feb. 23, 2001, 3 Pages.
Proton World and Europay to Co-Operate in Creation of New CEPS-Compliant E-Purse Application, Press Release 1999, Waterloo, Belgium, Jun. 28, 1999, 2 Pages.
Purse Application for Cross Border Use in Euro, Cordis, PACE 1st 1999-11531 PACE, www.cordis.lu, Printed Feb. 23, 2001, 3 Pages.
SK100 Smart Card Electronic Purse Balance Reader, SK100 Balance Reader, http://perso.wanadoo.fr, Printed Feb. 23, 2001, 1 Page.
Smart Card for Loyalty and E-Purse Applications Eclipses Capability of Conventional MAG-Stripe Cards, Press Release, www.1.sib.com, Apr. 21, 1997, Printed Feb. 23, 2001, 3 Pages.
Smartaxis: Load Cash on to Your E-Purse Card, Supported Currencies and Schemes, www.smartaxis.co.uk, Printed Feb. 23, 2001, 9 Pages.
Stuber; The Electronic Purse: An Overview of Recent Development and Issues, Bank of Canada, Technical Report No. 74, www.bankofcanada.ca, Jan. 1996, Printed Feb. 23, 2001, 2 Pages.
The Electronic Purse Reaches the Car Park, http:\\docs.Vircom.Net/Mobility/Parking, Printed Feb. 23, 2001, 2 Pages.
Understanding the Benefits: Smartcity Offers a Number of Important Benefits to Both the Card Issuers and Their Customers, http://www.icl.com/smartcards/benefits.htm, Printed Feb. 27, 2001, 2 Pages.
VISA First to Launch Electronic Purse Load Via GSM Mobile Phone, www.cellular.co.za, Johannesburg, ZA, Printed Feb. 23, 2001, 4 Pages.
Hansell; VISA to Unveil Electronic Purse Cards, New York Times, Printed Feb. 23, 2001, 2 Pages.
Machlis et al.; Will Smart Cards Replace ATMS?, Computerworld, Printed Feb. 23, 2001, 3 Pages.
Electronic Purse, SCIA (Smart Card Industry Association), About Smart Cards, www.Scia.org, Printed Feb. 23, 2001, 1 Page.
Hotchkiss; ATM's at the Head of Their Class, Bank Marketing, vol. 29, No. 3, Mar. 1997, pp. 26-32.
Bogle; Mutual Funds at the Millennium: Fund Directors and Fund Myths, The Vanguard Group to the '40 Act Institute of PLI (Practicing Law Institute), New York, NY, May 15, 2000, 15 Pages.
5500—FDIC General Counsel's Opinion No. 8—Stored Value Cards, 61 Fed. Reg. 40490, http://www.fdic.gov/regulations/laws/rules/5500-500.html, Aug. 2, 1996.
VISA Cash—Where Can I Get it?, www.visa-asia.com/pd/cash/where.html, Feb. 23, 2001.
VISA International and Sermepa Announce Plans for Cross Border VISA Cash Based on CEPS, www.visa.com/av/news/PRAAMISC111699.vhtml, Nov. 16, 1999.
Consortium Created to Manage Common Electronic Purse Specification, Cardtech Securtech, Chicago, www.visa.com/Av/News/PRMISC051199.vhtml, May 11, 1999.
VISA Releases Visa Cash Electronic Purse Specifications Based on CEPS, www.visa.com/Av/news/PRAAMISC042099.vhtml, San Francisco, Apr. 20, 1999.
Common Electronic Purse Specifications, Business Requirements, Version 6.0, Dec. 1998.
VISA Cash, www.visa-asia.com/pd/Cash/main.html, Feb. 23, 2001.
Universal Card Free Lifetime Membership Extended 3 Months, AT&T Marketing, www.att.com/press/0297/970217.csa.html, Dec. 4, 1990, 2 Pages.
Mailfrontier Survey Finds That Consumers Hold Financial Institutions Accountable for Online Identitiy Theft, www.mailfrontier.com, Palo Alto, CA, Nov. 2004.
Cardflash, Apr. 5, 2005.
E-Z Pass, Web Page, http:\\www.ezpass.com-whatis.html, Nov. 12, 2001.
E-Z Pass, Web Page, http:\\ezpass.com-framemain.html, Nov. 12, 2001.

E-Z Pass, Web Page, http://www.ezpass.com-disc_portnewyork.html, Nov. 12, 2001.
E-Z Pass, Web Page, http:\\www.ezpass.com-disc NY_annual.html, Nov. 12, 2001.
First USA—Activate Today and Get One Hour Free Calling Card Calls, Call 1-800-555-2535, First USA, 6 Pages.
First USA—Call 1(800)335-2453 to Receive One Free Hour of Domestic Long Distance Calling (No Strings Attached), First USA, 6 Pages.
Stoughton; The Gift of Credit, www.washingtonpost.com/wp-srv/business, Dec. 14, 1998.
Key Bank Holiday Offer, http://www.key.com/swiftgift/home.html, Printed Apr. 5, 1999.
Langheinrich et al.; Unintrusive Customization Techniques for Web Advertising, Computer Networks, vol. 31, 1999, pp. 1259-1272.
Mobasher et al.; Creating Adaptive Web Sites Through Usage-Based Clustering of URLS, Knowledge and Data Engineering Exchange Workshop, Chicago, IL and Los Alamitos, CA, 1999, pp. 19-25.
Edwards; ATMS the Hot New Media Buy, ABA Banking Journal, Mar. 1999, pp. 58, 60.
Hoovers, General Mills, Inc. Corporate Profile Relied Upon to Show the History of the Company, http://cobrands.hoovers.com/global/cobrands/proquest/history.xhtml?coid=10639, Jul. 12, 2005, 2 Pages.
Morgan et al.; Categorizing Risks for Risk Ranking, vol. 20, No. 1, Jun. 22, 2005, pp. 49-58.
Guidotti; Comparing Environmental Risks: A Consultative Approach to Setting Priorities at the Community Level, Public Health Rev 1994, vol. 22, Jun. 16, 2005, pp. 321-337.
Neumann; An Enhanced Neural Network Technique for Software Risk Analysis, IEEE Transactions on Software Engineering, vol. 28, No. 9, Sep. 1, 2002, pp. 904-912.
Lamond; Credit Card Transactions Real World and Online, Paying by Credit Card-Real World and Online, http:/.www.virtualschool.edu/mon/electronicproperty/klamond/credit, Printed Jul. 8, 2005, 17 Pages.
The Campus Card Conundrum, Card Technology, Journal ISSN: 1093-1279, p. 25+, February 1998, pp. 1-8.
Schwab, Charles; Now 7 Ways for a Better Total Return for Your Money; Schwat 1, The Inventor's Asset Management Account, Charles R. Schwab, Charles Schwab & Co., Inc., 16 Pages.
Smart Cards: Big Brother's Little Helpers, The Privacy Committee of New South Wales, No. 66, Aug. 1995.
Award Card Comparison, JA7922.
Card Based Award Systems, JA8309.
How is it Different?, JA8331.
Incenticard, Bellsouth, JA8329.
Meridian Award Cards, JA8251.
Meridian-The Leader in Card Marketing, JA8343.
Meridicard vs. Debit Cards, JA7917.
Glossman, et al.,; Glossman, et al., Citicorp Company Report, Report No. 1647151, p. 8 of 16.
Lexisnexis Academic, Debit Card Innovation, vol. XXXV, No. 5, p. 2, May 1997.
Block; First Data Subsidiary Creates Payroll Card for the Bankless, Lexisnexis Academic, Credit/Debit/ATMs, p. 10, Mar. 21, 1997.
Lexisnexis Academic, Debit Cards: Payroll Card UPS Fees, Future Banker, p. 18, Oct. 6, 1997.
Lexisnexis Academic, NTS' Transpay Debit Card Helps Remote and Unbanked Employees Get Funds Quicker, Financial News, Mar. 18, 1997.
Nora Wood; Corporate Spotlight, Incentive, Dec. 1997, 4 Pages.
Kenneth Hein; What's the Deal?, Incentive, Jul. 1998, 7 Pages.
Judy Quinn; Incentive Cards Explained, Incentive, Dec. 1995, 5 Pages.
Nora Wood; The Power of the Card, Incentive, Jul. 1997, 6 Pages.
Eight Keys to Making the Right Choice, Incentive, Dec. 1996, 9 Pages.
American Express Incentive Services, Incentive, Sep. 1996, p. 126.
Exclusively Yours From Maritza the Mastercard Card Ultimate Incentive, Incentive, Oct. 1995, 3 Pages.
Incentive Gift Card: Another Way to Give the Gift of Choice!, Incentive, Aug. 1995, 2 Pages.
Paper or Plastic? With These Three Incentives, The Choice is Yours, Incentive, Feb. 1996, 2 Pages.
Maritz, Incentive, Jun. 1996, p. 111.
Vincent Alonzo; Incentive Marketingathree if by Smart Card, Incentive Sep. 1995, p. 11.
The Federal Transit Administration, TCRP Report 32 Multipurpose Transit Payment Media, Chapter 2 Multipurpose Fare Payment: Overview, p. 10-20.
Allen et al.; Overview of Smart Cards and the Industry, Smart Cards: Seizing Strategic Business Opportunities, Chapter 1, p. 2-20, Irwin Professional Publishing, 1997.
Claessens, et al.; A Tangled World Wide Web of Security Issues, First Monday, Retrieved From the Internet at http://www.firstmonday.org/issues/issue7_3/Claessens, Retrieved From the Internet on Oct. 6, 2006.
D. O'Mahony; Electronic Payment System, 1997, Artech House, XP002137255, p. 7-11.
Definition of Store-Value Card, Wikipedia, Retrieved From the Internet at http://en.wikipedia.org/wiki/stored-value_card, Retrieved from the Internet on Apr. 16, 2007.

* cited by examiner

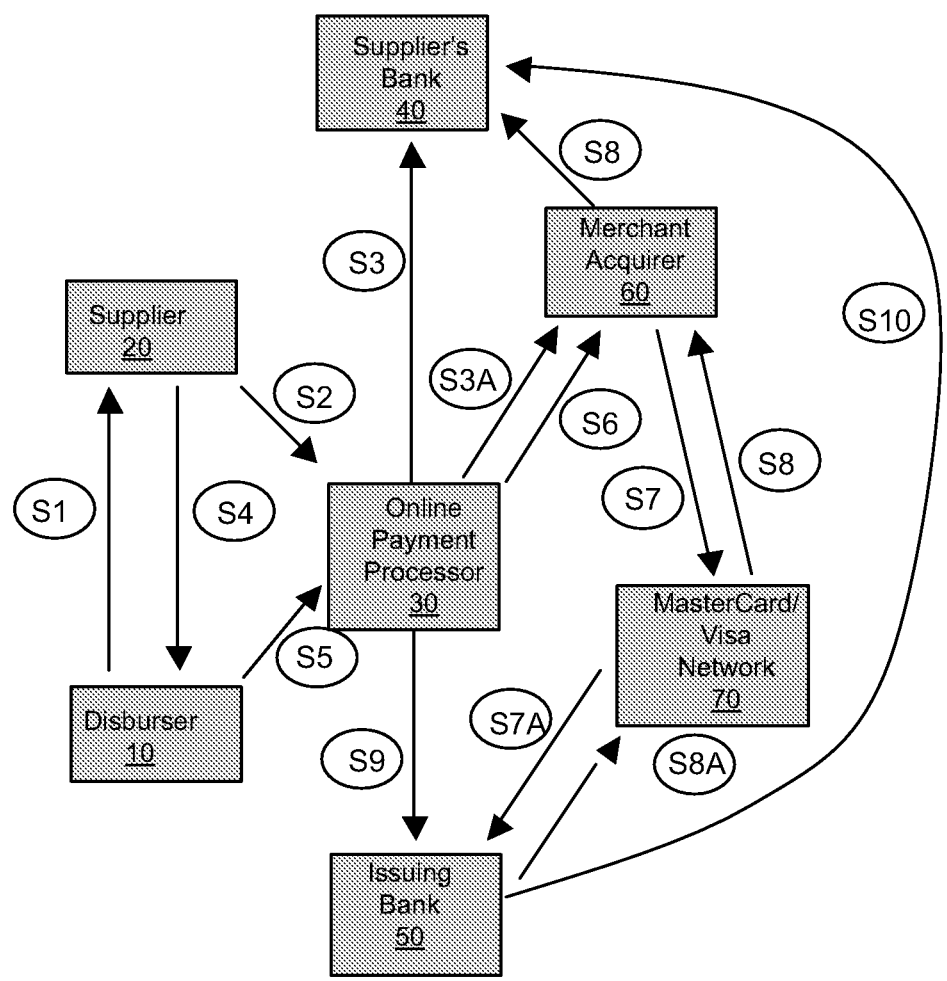

VARIABLE RATE PAYMENT CARD

FIELD OF THE INVENTION

Embodiments of the invention relate generally to credit and payment cards, and, in particular, to payment arrangements related to credit and payment cards in a business to business environment.

BACKGROUND OF THE INVENTION

In many business to business scenarios involving buyers (disbursers) and suppliers (merchants), the buyers still pay via check (paper), and suppliers have to wait a full thirty days, or typically, longer, to get paid. Such buyer-merchant relationships can benefit from the use of payment by electronic means, and earlier payments to the sellers.

The buyers, however, are reluctant to make use of card payment systems, because payment by check allows for greater control of payments, with less risk of fraud. Due to their risk-averse nature, commercial buyers tend to prefer the additional control, and fraud protection, afforded by check payments. In addition, buyers prefer to be able to control the time at which payment is made, so that cash flow and account balances can be properly maintained. Buyers typically enjoy the ability to maintain a "float" by delaying payment via check payments. In such scenarios, the buyer (disburser) orders goods from a supplier (merchant). The supplier then sends the goods, along with an invoice. The buyer then compares what has been ordered with what has been received, and, upon a satisfactory review, the invoice is approved, and a check can be issued. Such control is not allowed by typical merchant card payment systems.

Such buyers suffer, however, from inefficiencies involved with the use of paper payments, and leave cash on the table which could result from earlier payments.

Thus, there is a need for an improved systems and methods for providing improved payment arrangements related to credit and payment cards.

SUMMARY OF THE INVENTION

Embodiments of the invention are directed to these and other needs. Embodiments of the invention can include systems and methods of paying for transactions via a variable rate payment card scheme.

Embodiments are directed to systems and methods whereby a variable rebate is given for payment card purchases, based on how quickly payment is authorized.

A method of arranging for payment of a purchase includes receiving, from a supplier, agreement to accept a payment from a buyer via use of a payment card having variable payment terms; after a purchase by the buyer from the supplier, assessing the supplier a standard interchange rate; receiving, from the buyer, approval to pay the invoice; and issuing, to the supplier, a rebate, based upon when the approval to pay the invoice was received. The variable payment terms can be calculated by: determining a first early payment date; determining a second standard payment date; assessing against the supplier a first percentage of the standard interchange rate if the invoice is approved by the first early payment date; and assessing against the supplier a second percentage of the standard interchange rate if the invoice is approved on or after the second standard payment date.

A benefit to the supplier in this scenario is that electronic payment with cash can be accelerated in time with the amount of the interchange. The interchange can be adjusted by an amount being proportional (or related to) to the number of days the cash is accelerated.

Such buyers can benefit from the migration from checks to electronic payments, plus some level of payment card rebate, also proportional to the number of days cash is accelerated to the supplier. The buyer can be motivated to approve and pay invoices as early as possible, to increase the level of rebate captured. This, in turn, benefits suppliers interested in cash accelerated at modest incremental cost.

BRIEF DESCRIPTION OF THE DRAWINGS

The present invention will be more readily understood from the detailed description of exemplary embodiments presented below considered in conjunction with the attached drawings, of which:

FIG. 1 illustrates a payment card scenario in accordance with embodiments of the present invention.

It is to be understood that the attached drawings are for purposes of illustrating the concepts of the invention.

DETAILED DESCRIPTION OF THE INVENTION

Aspects of the invention are directed to systems and methods for providing a payment card whereby a variable rebate is given for payment card, based on how quickly payment is authorized. In the closed loop network of certain embodiments, a full interchange rate is charged up front, as with a traditional interchange, but, in some embodiments, a portion of that interchange may be rebated back to the supplier by the card issuing bank, based on the length of time it takes for the buyer to approve the underlying invoices for payment. As is known to those of skill in the art, an interchange is a fee, typically paid by an acquiring bank/merchant bank to the issuing bank. The fee is meant to compensates the issuer for the time after settlement with the acquiring bank/merchant bank and before it recoups the settlement value from the cardholder.

By way of embodiments of the invention, a merchant/supplier is assessed the standard interchange rate if the associated invoice is approved and payment is initiated within a first predetermined number of days, and a reduced interchange rate if payment is not made until a second predetermined number of days, or later. Thus each day delay beyond the first predetermined number of days in initiating payment results in a reduction in net interchange.

A benefit to the supplier in this scenario is that electronic payment with cash can be accelerated in time with the amount of the interchange. The interchange is thus adjusted in a manner being somewhat proportional to (or related to) the number of days the cash is accelerated.

FIG. 1 illustrates a payment card scenario in accordance with embodiments of the invention. In step S1, a Disburser (payer) 10 gets Supplier (merchant) 20 to accept payment via a purchasing card with variable (or dynamic) interchange terms. The Disburser 10 will be able to induce the supplier 20 to accept such payment terms if, for example, the payer is a large account, or otherwise has commercial leverage over the Supplier 20. In step S2, the Supplier 20 enrolls in an Online Payment Processor 30 service to enable such payment with variable (or dynamic) interchange terms. As part of this online enrollment process, the Supplier 20 provides its Merchant Acquiring number, as is known to those of skill in the art, and Bank Demand Deposit Account (DDA) number. (As is known to those of skill in the art, a DDA is an account from which deposited funds can be withdrawn at any time without any notice to the depository institution. Most checking and savings accounts are demand deposits, accessible by the account holder at any time). In step S3, The Online Payment Processor 30 contacts the Merchant Acquirer 60 and the Supplier's Bank 40, respectively, to verify these numbers.

In step S4, the Supplier 20 sends an invoice to the Disburser 10 with a stated invoice due date and net terms (e.g., day 30). In step S5, the Disburser 10 approves payment for the invoice and sends a payment file to the Online Payment Processor 30, which contains a dummy Merchant Acquiring number.

In step S6, the Online Payment Processor 30 overlays an actual Merchant Acquiring number and acts as a virtual point of sale (POS) terminal which generates a standard card payment authorization request which gets sent to the Merchant Acquirer 60. In step S7, the Merchant Acquirer 60 sends a payment authorization request to the Issuing Bank 50 via the MasterCard/Visa network 70. In step S8, the Issuing Bank 50 approves the authorization request back to Merchant Acquirer 60 via a MasterCard/Visa network (or other such credit card network) 70 and payment funds get deposited to the Supplier's Bank 40.

In step S9, following successful authorization of the payment, the Online Payment Processor 30 calculates the number of days between the day on which the payment was authorized/settled and the due date on the invoice. If the card settlement date precedes the invoice date, then the Online Payment Processor 30 calculates the interchange rebate due back to the supplier at a "daily interchange rebate rate." The Online Payment Processor 30 then generates an automatic clearinghouse (ACH) debit file which debits a house demand deposit account (DDA) owned by the Issuing Bank 50 for the calculated rebate amount.

In step S10, this ACH file gets sent to the Issuing Bank's 50 ACH department for processing, as is known to those of skill in the art, which results in the Supplier's Bank 40 being credited with funds equal to the calculated rebate amount and the Issuing Bank's 50 house DDA being debited for the same.

In some embodiments, at the time of enrollment (initiation of the account relationship) the Supplier 20 and Disburser 10 agree on card payment terms inclusive of an interchange rebate. As used herein, the "daily interchange rebate rate" is calculated as the difference between an "earliest payment date" (e.g., day ten after invoice issuance) and the invoice due date (e.g., day thirty, or other mutually agreed upon date). For example, for terms of 2.2% on day ten and 1.0% on day thirty, the "daily interchange rebate rate" would be 1.2% divided by twenty days, or 0.06%. Other daily interchange rates can be used at would be known to those of skill in the art, as informed by the present disclosure. In addition, the terms of the transaction can also be related to the size and/or quantity of the order.

In use, in some embodiments, a payment card settlement product can be implemented as follows.

Suppliers 20 can enroll in an online closed-loop network involving a merchant acquirer 60 and an online payment processing application 30. Payments in this closed loop network are uniquely identified, and thus, can be treated differently than other card transactions. The unique identifier can be, for example, a predefined number or pool of numbers or digits related to, or that are a part of, the payment card number.

Merchants/suppliers 20 can enroll online and either (1) authorize the network to act as a virtual point of sale ("POS") terminal to initiate payments from participating buyers/clients in the network; or (2) initiate payments from participating buyers/clients in the network using their own POS terminals.

In general, in some embodiments, features of the interchange on the closed loop network more closely align cost and benefit as compared to a traditional interchange. (As is known to those of skill in the art, interchange fees are fees charged between businesses as part of the operation of credit card networks). By way of non-limiting example, a traditional interchange is fixed at a level of approximately 2.20% plus merchant acquiring fees, regardless of when payment is initiated. In contrast, by way of embodiments of the invention, the full 2.20% is charged up front, as with traditional interchange, but a portion of that interchange may be rebated back to the supplier 20 by the card issuing bank 50 based on the length of time it takes for the buyer to approve the underlying invoices for payment.

In one example, a supplier 20 agrees to accept payment via payment card with terms of "2.20/10, 1.00/30." These terms mean that the merchant/supplier 20 would be assessed the standard interchange of 2.20% if the associated invoice is approved and payment is initiated within ten days, and a net interchange of only 1.00% if payment is not made until day thirty or later. Thus, each day delay beyond day ten in initiating payment results in a reduction in net interchange of 0.055%. A ten day delay would result in a net reduction of 0.550% or net interchange of 1.65% versus the standard 2.20%.

As the transaction in this example is continued, upon invoice approval, which in this example occurs on day twenty, the online payment processing application 30 automatically initiates settlement via payment card and the supplier is assessed an interchange of 2.20% using standard merchant acquiring processes and rails (i.e., infrastructure). At the same time, a credit equivalent to 0.55% is initiated by the issuing bank back to the merchant/supplier, either directly via the ACH network, or via the merchant acquirer 60. This 0.55% reflects the ten day delay in approving the invoice and initiating payment resulting in net interchange of 1.65% to the supplier 20.

A benefit to the supplier in this scenario is electronic payment with cash accelerated up to twenty days with the amount of the interchange being somewhat proportional to the number of days of cash is accelerated. The minimum 1.00% interchange for payment at day thirty or later would be required to compensate the issuing bank and card association (e.g. Visa/MasterCard, etc.) for costs incurred by initiating electronic payment via the payment card method described herein. (It is assumed that this 1.00% discount would be acceptable to a significant percentage of suppliers 20, even with no cash acceleration, to the other above-described benefits).

A benefit to the buyer in this scenario is migration from checks to electronic payments, plus some level of payment card rebate, also proportional to the number of days cash is accelerated to the supplier. The buyer is therefore motivated to approve and pay invoices as early as possible, to increase the level of rebate captured. This, in turn, benefits suppliers interested in cash accelerated at modest incremental cost (e.g., 1.00% at day thirty versus. 2.20% at day ten or earlier). In some embodiments, a rebate can also be issued to the buyer, thus providing additional motivation for the buyer to use the system. The rebate to the buyer can also be based on accelerated payment, thus providing additional incentive to pay the supplier quickly.

By way of embodiments of the invention, the issuing bank 50 benefits when payments are made via payment cards as opposed to other payment methods due to the capture of some level of net interchange which is pre-determined by the card associations (e.g., Visa/MasterCard, etc.) for payments made via the unique closed-loop network of the invention. The issuing bank 50 could also benefits by having a unique and superior value proposition versus all other payment card providers.

In accordance with the invention, other payment schedules and interchange rates can be used, as would be known to one of skill in the art, as informed by the present disclosure.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A computer-implemented method of arranging for payment of a purchase, said method comprising the steps of:
    receiving from a supplier, at a programmed computer, an agreement to accept a payment from a buyer via use of a payment card having variable payment terms;
    receiving from the supplier, at a programmed computer, a demand deposit account number associated with a demand deposit account of the supplier;
    enrolling the supplier in a payment network using the programmed computer;
    issuing a unique identifier to payments issued to suppliers enrolled in the payment network;
    receiving authorization from the supplier, from a programmed computer, to either (i) authorize the payment network to act as a virtual point of sale terminal to initiate payments from buyers enrolled in the payment network or (ii) initiate payments from buyers enrolled in the payment network using the supplier's point of sale terminal;
    after a purchase by the buyer from the supplier, assessing the supplier, using the programmed computer, a standard interchange rate;
    receiving from the buyer, at the programmed computer, an approval to pay the invoice
    initiating payment from the buyer to the supplier; and
    issuing a rebate to the demand deposit account of the supplier, using the programmed computer, based upon when the approval to pay the invoice was received.

2. The method of claim 1, wherein the variable payment terms are calculated by:
    determining a first early payment date;
    determining a second standard payment date;
    assessing against the supplier a first percentage of the standard interchange rate if the invoice is approved by the first early payment date; and
    assessing against the supplier a second percentage of the standard interchange rate if the invoice is approved on or after the second standard payment date.

3. The method of claim 2, wherein the variable payment terms are further calculated by:
    reducing the percentage of the standard interchange rate assessed against the supplier by a proportion of the time that an invoice is approved between the first early payment date and the second standard payment date.

4. A computer-implemented method of arranging for payment of a purchase, said method comprising the steps of:
    receiving from a supplier, at a programmed computer, an agreement to accept a payment from a buyer via use of a payment card having variable payment terms;
    receiving from the supplier, at a programmed computer, a demand deposit account number associated with a demand deposit account of the supplier;
    enrolling the supplier in a payment network using the programmed computer;
    issuing a unique identifier to payments issued to suppliers enrolled in the payment network;
    receiving authorization from the supplier, from a programmed computer, to either (i) authorize the payment network to act as a virtual point of sale terminal to initiate payments from buyers enrolled in the payment network or (ii) initiate payments from buyers enrolled in the payment network using the supplier's point of sale terminal;
    after a purchase by the buyer from the supplier, assessing the supplier, using the programmed computer, a predetermined interchange rate;
    receiving from the buyer, at the programmed computer, an approval to pay the invoice;
    initiating payment from the buyer to the supplier; and
    issuing a rebate to the demand deposit account of the supplier, using the programmed computer, based upon when the approval to pay the invoice was received.

5. The method of claim 4, wherein the variable payment terms are calculated by:
    determining a first payment date;
    determining a second payment date;
    assessing against the supplier a first percentage of the predetermined interchange rate if the invoice is approved by the first payment date; and
    assessing against the supplier a second percentage of the predetermined interchange rate if the invoice is approved on or after the second payment date.

6. The method of claim 5, wherein the variable payment terms are further calculated by:
    reducing the percentage of the standard interchange rate assessed against the supplier by a proportion of the time that an invoice is approved between the first early payment date and the second standard payment date.

7. The method of claim 1, further comprising:
    receiving from a supplier, at a programmed computer, an authorization to act as a virtual point of sale terminal to initiate payments from the buyer.

8. The method of claim 1, further comprising:
    receiving from a supplier, at a programmed computer, an authorization to initiate payments from the buyer using point of sale terminals of the buyer.

9. A computer-implemented method for processing payment from a buyer to a supplier, by way of a payment card, said method comprising the steps of:
    receiving from the buyer, at a programmed computer, an agreement to pay the supplier via use of the payment card having variable payment terms;
    receiving from the supplier, at a programmed computer, a demand deposit account number associated with a demand deposit account of the supplier;
    enrolling the supplier in a payment network using the programmed computer;
    issuing a unique identifier to the payment card, wherein the unique identifier indicates the payment card is part of the payment network;
    receiving authorization from the supplier, from a programmed computer, to either (i) authorize the payment network to act as a virtual point of sale terminal to initiate payments from buyers enrolled in the payment network or (ii) initiate payments from buyers enrolled in the payment network using the supplier's point of sale terminal;

after a purchase by the buyer from the supplier, assessing the supplier, using the programmed computer, a standard interchange rate;

receiving from a buyer, at the programmed computer, an approval to pay the invoice;

initiating payment from the buyer to the supplier; and issuing a rebate to the demand deposit account of the supplier, using the programmed computer, based upon when the approval to pay the invoice was received.

10. The method of claim 9, wherein the variable payment terms are calculated by:
   determining a first early payment date;
   determining a second standard payment date;
   assessing against the supplier a first percentage of the standard interchange rate if the invoice is approved by the first early payment date; and
   assessing against the supplier a second percentage of the standard interchange rate if the invoice is approved on or after the second standard payment date.

11. The method of claim 10, wherein the variable payment terms are further calculated by:
   reducing the percentage of the standard interchange rate assessed against the supplier by a proportion of the time that an invoice is approved between the first early payment date and the second standard payment date.

12. A computer-implemented method for processing payment from a buyer to a supplier, by way of a payment card, said method comprising the steps of:
   receiving from the buyer, at a programmed computer, an agreement to pay the supplier via use of the payment card having variable payment terms;
   receiving from the supplier, at a programmed computer, a demand deposit account number associated with a demand deposit account of the supplier;
   enrolling the supplier in a payment network using the programmed computer;
   issuing a unique identifier to the payment card, wherein the unique identifier indicates the payment card is part of the payment network;
   receiving authorization from the supplier, from a programmed computer, to either (i) authorize the payment network to act as a virtual point of sale terminal to initiate payments from buyers enrolled in the payment network or (ii) initiate payments from buyers enrolled in the payment network using the supplier's point of sale terminal;
   after a purchase by the buyer from the supplier, assessing the supplier, using the programmed computer, a standard interchange rate;
   after a purchase by the buyer from the supplier, assessing the supplier, using the programmed computer, a predetermined interchange rate;
   receiving from the buyer, at the programmed computer, an approval to pay the invoice;
   initiating payment from the buyer to the supplier; and
   issuing a rebate to the demand deposit account of the supplier, using the programmed computer, based upon when the approval to pay the invoice was received.

13. The method of claim 12, wherein the variable payment terms are calculated by:
   determining a first payment date;
   determining a second payment date;
   assessing against the supplier a first percentage of the predetermined interchange rate if the invoice is approved by the first payment date; and
   assessing against the supplier a second percentage of the predetermined interchange rate if the invoice is approved on or after the second payment date.

14. The method of claim 13, wherein the variable payment terms are further calculated by:
   reducing the percentage of the standard interchange rate assessed against the supplier by a proportion of the time that an invoice is approved between the first early payment date and the second standard payment date.

15. The method of claim 12 further comprising:
   receiving from a supplier, at a programmed computer, an authorization to act as a virtual point of sale terminal to initiate payments from the buyer.

16. The method of claim 12 further comprising:
   receiving from a supplier, at a programmed computer, an authorization to initiate payments from the buyer using point of sale terminals of the buyer.

17. A computer-implemented method of arranging for payment of a purchase, said method comprising the steps of:
   receiving from a supplier, at a programmed computer, an agreement to accept a payment from a buyer via use of a payment card having variable payment terms;
   receiving from the supplier, at a programmed computer, a demand deposit account number associated with a demand deposit account of the supplier;
   enrolling the supplier in a payment network using the programmed computer;
   issuing a unique identifier to payments issued to suppliers enrolled in the payment network;
   receiving authorization from the supplier, from a programmed computer, to either (i) authorize the payment network to act as a virtual point of sale terminal to initiate payments from buyers enrolled in the payment network or (ii) initiate payments from buyers enrolled in the payment network using the supplier's point of sale terminal;
   after a purchase by the buyer from the supplier, assessing the supplier, using the programmed computer, a standard interchange rate;
   receiving from the buyer, at the programmed computer, an approval to pay the invoice;
   initiating payment from the buyer to the supplier;
   issuing a first rebate to the demand deposit account of the supplier, using the programmed computer, based upon when the approval to pay the invoice was received; and
   issuing a second rebate to the buyer, using the programmed computer, based upon when the approval to pay the invoice was received.

* * * * *